United States Patent
Wohlrab

(10) Patent No.: US 7,445,439 B2
(45) Date of Patent: Nov. 4, 2008

(54) CLAMPING UNIT WITH DOUBLE CRANK DRIVE

(75) Inventor: Walter Wohlrab, Weissenburg (DE)

(73) Assignee: Krauss-Maffei Kunststofftechnik GmbH, Munich (DE)

( * ) Notice: Subject to any disclaimer, the term of this patent is extended or adjusted under 35 U.S.C. 154(b) by 0 days.

(21) Appl. No.: 11/559,432

(22) Filed: Nov. 14, 2006

(65) Prior Publication Data

US 2007/0071848 A1 Mar. 29, 2007

Related U.S. Application Data

(63) Continuation of application No. PCT/EP2005/004288, filed on Apr. 21, 2005.

(30) Foreign Application Priority Data

May 29, 2004 (DE) .................. 10 2004 026 450

(51) Int. Cl.
B29C 45/66 (2006.01)

(52) U.S. Cl. .................. 425/107; 100/282; 425/451.5; 425/592

(58) Field of Classification Search .................. 425/107, 425/190, 592, 451.5; 100/282
See application file for complete search history.

(56) References Cited

U.S. PATENT DOCUMENTS

| 2,269,389 | A | * | 1/1942 | Weida | 100/282 |
| 3,277,534 | A | * | 10/1966 | Stockman et al. | 425/451.5 |
| 3,507,012 | A | * | 4/1970 | Aoki | 425/592 |
| 3,719,445 | A | * | 3/1973 | Sindelar | 425/107 |
| 5,069,613 | A | * | 12/1991 | Inaba et al. | 425/589 |
| 5,217,662 | A | * | 6/1993 | Yamamura et al. | 425/107 |
| 6,050,804 | A | * | 4/2000 | Tamaki et al. | 425/190 |
| 6,102,685 | A | * | 8/2000 | Miura et al. | 425/451.5 |
| 6,884,059 | B2 | * | 4/2005 | Giacobbe | 425/451.9 |

FOREIGN PATENT DOCUMENTS

| DE | 203 14 443 U1 | | 5/2004 |
| GB | 1 309 763 A | | 3/1973 |
| JP | 01 295815 A | | 2/1990 |
| JP | 6-71412 | * | 3/1994 |
| JP | 2000-141436 | * | 5/2000 |
| JP | 2003 154566 A | | 9/2003 |

* cited by examiner

Primary Examiner—James Mackey
(74) Attorney, Agent, or Firm—Henry M. Feiereisen; Ursula B. Day

(57) ABSTRACT

A clamping unit for an injection molding machine includes a fixed platen, a support platen, and a moving platen which is arranged between the fixed platen and the support platen for back and forth movement. An opening and closing mechanism constructed as crank drive having at least one crank disk is provided to effect a back and forth movement of the moving platen in relation to the support platen, with the crank disk rotatable by a drive mechanism. A first connecting rod links the crank disk to the support platen, and a second connecting rod links the crank disk to the moving platen, wherein at least one of the first and second connecting rods is articulated in eccentric relationship to the crank disk. A pulling means extends between the support platen and the fixed platen to allow a buildup of a clamping force between the fixed platen and the moving platen.

23 Claims, 7 Drawing Sheets

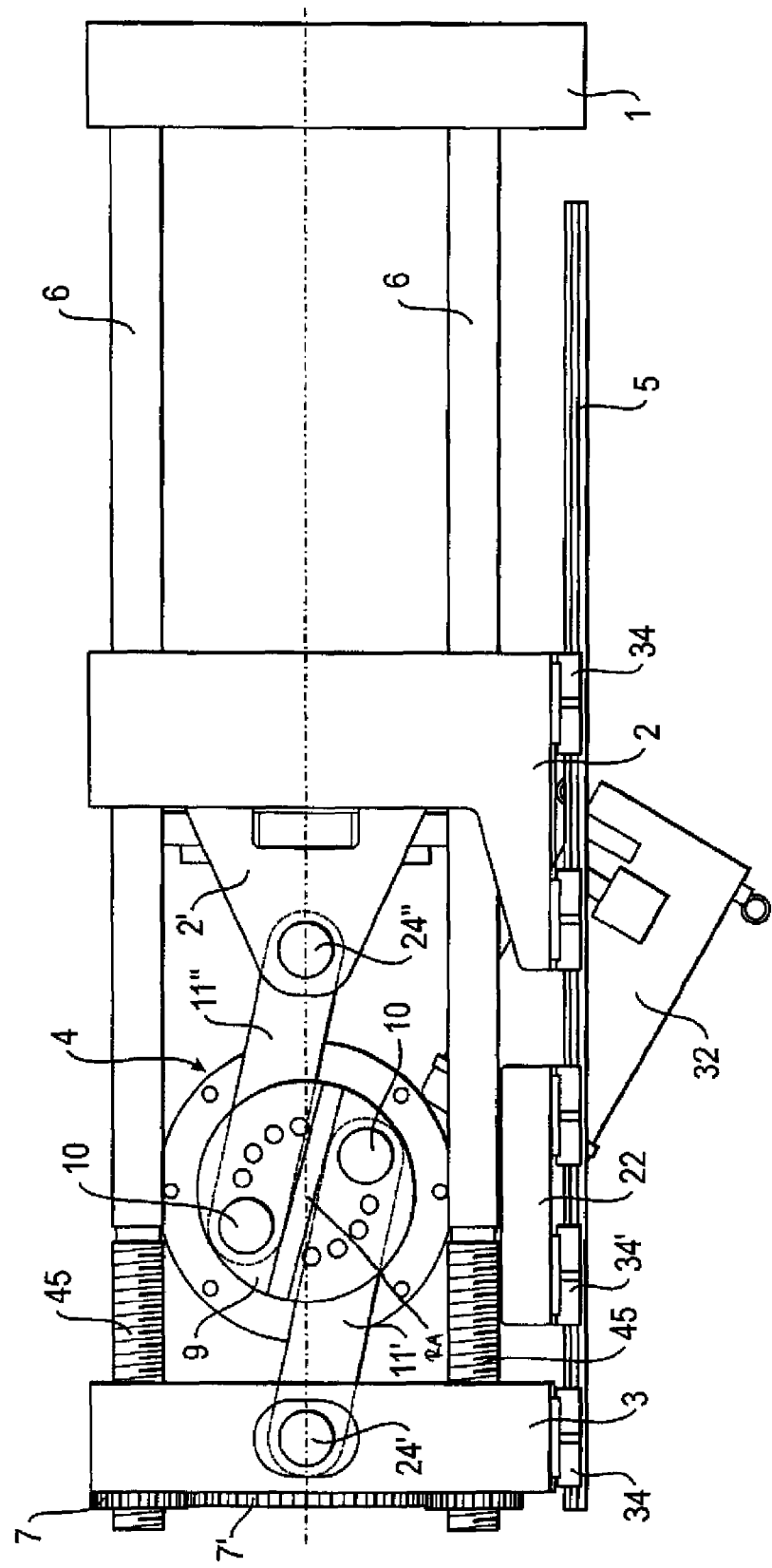

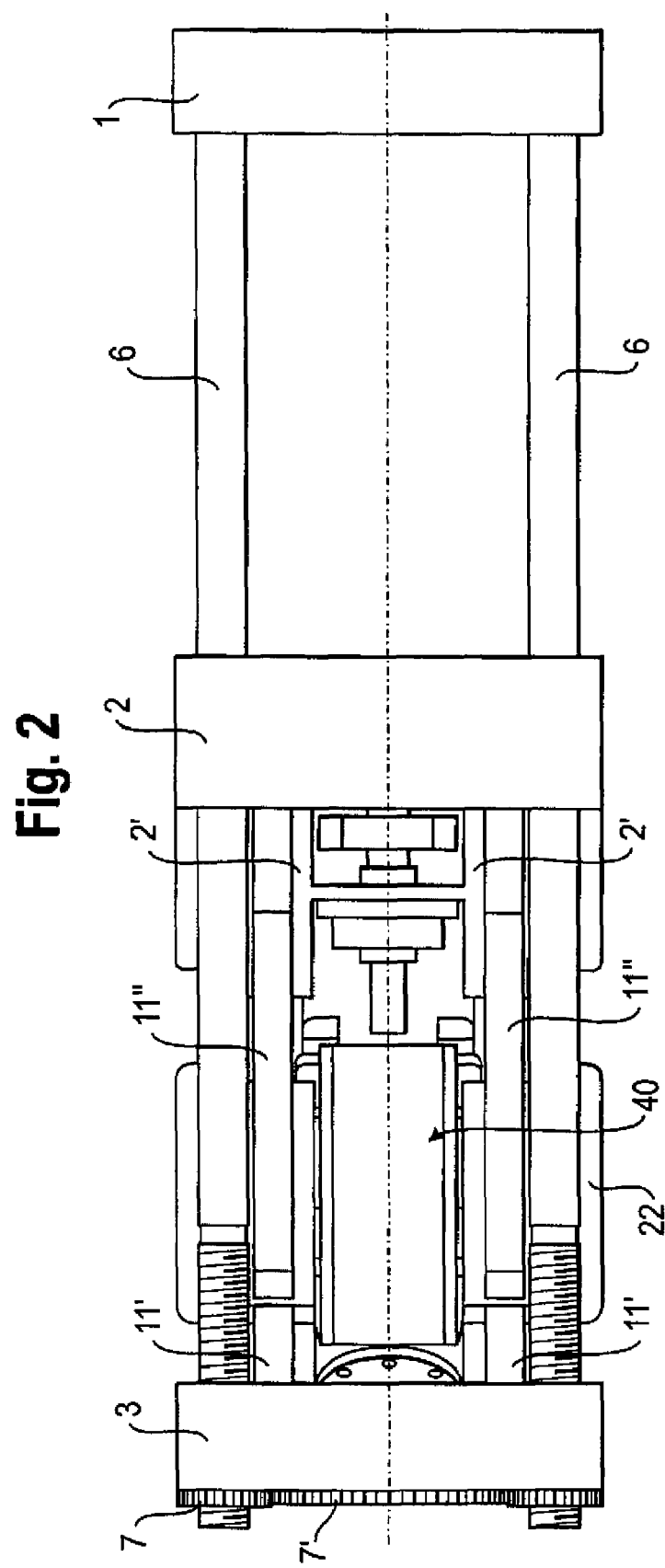

CLAMPING UNIT WITH DOUBLE CRANK DRIVE

CROSS-REFERENCES TO RELATED APPLICATIONS

This application is a continuation of prior filed copending PCT International application no. PCT/EP2005/004288, filed Apr. 21, 2005, which designated the United States and has been published but not in English as International Publication No. WO 2005/115718A1 and on which priority is claimed under 35 U.S.C. §120, and which claims the priority of German Patent Application, Serial No. 10 2004 026 450.3, filed May 29, 2004, pursuant to 35 U.S.C. 119(a)-(d), the contents of which are incorporated herein by reference in their entirety as if fully set forth herein.

BACKGROUND OF THE INVENTION

The present invention relates, in general, to a clamping unit with double crank drive.

Nothing in the following discussion of the state of the art is to be construed as an admission of prior art.

Clamping units are typically used for presses or injection molding machines. In general, injection molding machines have two mold halves for formation of a cavity which normally are held together through application of a great clamping pressure in order to be able to inject a plasticized melt into the cavity without escape. For this purpose, the molding tools are normally arranged on two platens of a clamping unit which can be moved to and away from one another. When the mold is closed, a plastic melt is introduced into the cavity for formation of a plastic product. When the mold is open, the thus-produced plastic product can then be removed after undergoing curing.

Clamping units can come in different configurations, such as a 3-platen clamping unit or a 2-platen clamping unit. A 2-platen clamping unit normally includes a fixed platen and a moving platen which are connected together via a pulling means. By means of such a pulling means, e.g. tie rods, the two platens can be moved in relation to one another and a clamping force can be applied. 3-platen clamping units normally include a fixed platen as well as a support platen. A moving platen is arranged between the fixed platen and the support platen and movable back and forth by a drive in relation to the fixed platen. The drive is normally arranged between the moving platen and the support platen. Known drive options include hydraulic clamping devices, such as hydraulic pistons or toggle systems, which can be hydraulically or electrically operated in many ways.

In toggle or connecting rod systems, the maximum stroke between the moving platen and the fixed platen is predefined by the toggle construction so that the distance between the support platen, on one hand, and the moving platen, on the other hand, can vary only within a defined distance range. Moreover, the clamping force can oftentimes be applied only in an extended disposition or dead center disposition.

The manufacture of different parts between the fixed platen and the moving platen requires different molds, in particular molds of different thickness, so that there is a general need for providing a toggle or connecting rod construction also with an adjustment mechanism to conform to a mold—either for the fixed platen or for the combination of moving platen, support platen and drive. This adjustment not only enables to match the distance between the fixed platen and the moving platen to the different mold thicknesses but also allows execution of a service or maintenance stroke. Numerous constructive solutions are known for this type of adjustment.

It would therefore be desirable and advantageous to provide an improved clamping unit to obviate prior art shortcomings and to be simple and robust in structure and cost-efficient to implement.

SUMMARY OF THE INVENTION

According to one aspect of the present invention, a clamping unit for an injection molding machine includes a fixed platen, a support platen, a moving platen arranged between the fixed platen and the support platen, an opening and closing mechanism for back and forth movement of the moving platen in relation to the support platen, with the opening and closing mechanism being constructed as crank drive having at least one crank disk, a drive mechanism operatively connected to the crank drive for rotating the crank disk, a first connecting rod for linking the crank disk to the support platen, a second connecting rod for linking the crank disk to the moving platen, wherein at least one of the first and second connecting rods is articulated in eccentric relationship to the crank disk, and a pulling means extending between the support platen and the fixed platen to allow a buildup of a clamping force between the fixed platen and the moving platen.

In accordance with the invention, a 3-platen clamping unit is used, thus including a platen, which is fixed at least during the operating stroke, and a platen, which is movable during the operating stroke and supported by an opening and closing mechanism in relation to the support platen.

The present invention resolves prior art shortcomings by configuring the opening and closing mechanism as double crank drive with at least one crank disk which is connected via at least one connecting rod with the support platen and via another connecting rod with the moving platen. At least one of the connecting rods is hereby articulated eccentrically on the rotatably driven crank disk. The rotary drive for the crank disk is realized by means of a separate drive.

Both connecting rods are normally articulated in eccentric relation to the crank disk. Suitably, the connecting rods are articulated to the crank disk at same eccentricity and in diametrically opposite relationship. As a result, a double crank drive is realized which, compared to a simple crank drive, has the advantage of a greater stroke length at same torque introduction. Thus, a relative movement is implemented between crank drive and support platen as well as also between crank drive and moving platen, during operation of the crank drive. When the support platen is fixed during normal operating stroke, the crank drive travels in a same manner as the moving platen back and forth during opening and closing.

Of course, there is no need to actually configure the crank disk in the form of a disk. What is important is only an eccentric articulation of at least one of the connecting rods via an eccentric bolt. This can be realized also by a crank disk that is not entirely configured as a disk (for example a crank lever, etc.).

For the sake of simplicity, the following description assumes that the connecting rods are articulated at same eccentricity upon the crank disk. The construction of the connecting rods as well as the arrangement on the crank disk is suitably implemented in such a manner as to allow during operation of the crank disk an angular movement of up to 120° in relation to the closing position of the moving platen. Of course, certain constructions enable also rotations of the crank disk by about 180°. This would correspond to the constructively maximal possible stroke. When rotated by 120° in relation to the dead center in the closing position, the opening stroke amounts to about 1.5 times the diameter of the eccentric. A rotation about 180° would mean that the maximal possible opening and closing stroke during the operation corresponds to twice the diameter of the eccentric (starting from an articulation of both connecting rods of first and second types with same eccentricity).

According to another feature of the present invention, the crank drive may have two crank disks which are arranged in parallel side-by-side disposition and connected in fixed rotative engagement, with each of the crank disks linked by the first connecting rods to the support platen and by the second connecting rods to the moving platen. In this way, the substantial clamping forces can be better absorbed and the force introduction into the construction parts is more evenly distributed. The connecting rods may hereby be disposed in alignment in a radial plane. This, however, eliminates the possibility of a 180° rotation of the crank disk. If it is desired to rotate the crank disk about the maximum stroke of 180°, the connecting rods would have to be disposed in offset relationship to the radial plane of the crank disk. A radially aligned disposition has however the benefit that no shearing or torsional forces are encountered in the direction of the rotation axis.

When two crank disks are used, the crank drive is suitably configured in symmetry with respect to a center axis so that the force introduction upon the support platen as well as upon the moving platen is as even as possible.

According to another feature of the present invention, a gear may be placed between and securely connected to the two crank disks and operatively connected with the drive mechanism. An adjustable electric motor may be used as drive mechanism having a pinion or driving screw on its output shaft. The gear and the pinion or the driving screw form a step-down gear mechanism. As a result of this gear reduction, the required high torque for the clamping operation is generated.

Of course, it is also possible to use any number of other drives for the crank disk or crank disks. Important is only that the crank disk can be operated with the required moment.

As an alternative, it is for example possible to attach a further eccentric bolt between or upon both crank disks or on a crank disk for attachment of a hydraulic piston by which the crank disk is rotated during linear operation thereof. However, the use of an electric motor is normally chosen because a hydraulic drive can also be directly combined with the platen.

It is also possible to operate the crank disk via an electric direct drive. However, existing torque limitations of such direct drives and costs may still prove a detriment to their use. Theoretically it would however be possible to provide between both crank disks an electric direct drive with a stator and a rotor connected to the crank disk or crank disks so as to eliminate the need for a gear mechanism.

It is further possible to use several electric motors which are attached for example to a gear, as described above. In this way, it is possible to distribute the loads upon the gear more evenly about its circumference, on one hand, and to select smaller motor, on the other hand. This is especially of interest in the case when costs for motors rise disproportionally in relation to the torques. In this case, it may be more cost-efficient to use two or three electric motors instead of a single large motor. Of course, this affects also the construction.

According to another feature of the present invention, the moving platen may be guided for linear back and forth movement on at least one guide rail. Of course more than one guide rails may be provided as well.

Since the crank drive too moves back and forth during opening and closing movements, while the support platen is fixed, the crank drive together with the overall drive unit may be arranged for back and forth movement on at least one guide rail via a common bearing block.

According to another feature of the present invention, the pulling means between the support platen and the fixed platen may be realized by at least two, suitably four, tie rods. As an alternative, a support may be implemented also by a respectively configured machine frame, whereby respectively designed support elements would have to be provided on the outside of the fixed platen and the support platen. The type of pulling means is however secondary as far as the present invention is concerned.

As the double crank drive allows only a limited stroke at any given time and the closing position should be realized in a dead center, a separate adjustment option should be provided in most cases for allowing use of different molds. This, however, could be avoided if the opening and closing strokes are sized sufficiently for service and maintenance purposes. An example could be machines for manufacturing optical data carriers.

The adjustment devices for the service and maintenance stroke can also be designed in many ways. On one hand, it is possible to movably configure the platen normally fixed during the operating stroke. On the other hand, it is also possible to equip the combination of support platen, crank drive and moving platen with such an adjustment.

According to another feature of the present invention, the tie rods are equipped with a thread on the end that is proximal to the support platen. Each tie rod is associated to a spindle nut which is arranged in the support platen rotatably but fixed in axial direction for interaction with the pertaining tie rod thread. Through joint rotation of all spindle nuts, for example by means of a common drive, the distance between the fixed platen, on one hand, and the combination of moving platen, support platen and crank drive, on the other hand, can be adjusted. Of course, the adjustment of spindle nut and tie rod could also be arranged on the side of the fixed platen. Also possible is an embodiment in which the support platen is fixedly connected with a machine frame, with the fixed platen being fixed only during operation while being adjustable during service and maintenance operation.

An important feature for achieving a long-lasting, smooth operation of the clamping unit is the lubrication of the points of articulation as well as of an existing gear mechanism. The connecting rods are suitably held by bolts on the respective construction part, i.e. the support platen, the crank disks, or the moving platens. According to another feature of the present invention, a lubricant space in the form of an annular gap is provided at each bolt between the bolt surface and in the bore of the connecting rod, with a lubricant inlet and a lubricant drain being arranged for each annular gap. The two annular gaps of a connecting rod are interconnected via a flow channel. As a result, each connecting rod can be lubricated in such a way that lubricant flows to a first annular gap, the lubricant then is conducted from this one annular gap via a flow channel to the second annular gap, and drained there via a lubricant drain. The lubricant drain ports suitably into a housing for the crank drive in which also the crank disks are supported and the gear is received. In this way, also the gear mechanism comprised of crank gear and screw drive or pinion can be lubricated. Lubricant may again be discharged from the gearbox via a drain with a pump and supplied again to the connecting rods.

According to another feature of the present invention, the ring gap is effectively sealed against the outside. This type of lubrication enables the realization of an encapsulated drive set with leak-proof joints to ensure that the clamping unit is also fit for use in a clean room environment.

A suitable construction enables a small number of components for the drive set (for example all connecting rods may be identical) and a robust configuration.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 is a schematic side view of a clamping unit according to the invention;

FIG. 2 is a schematic plan view of the clamping unit of FIG. 1;

DETAILED DESCRIPTION OF PREFERRED EMBODIMENTS

Figure 6:
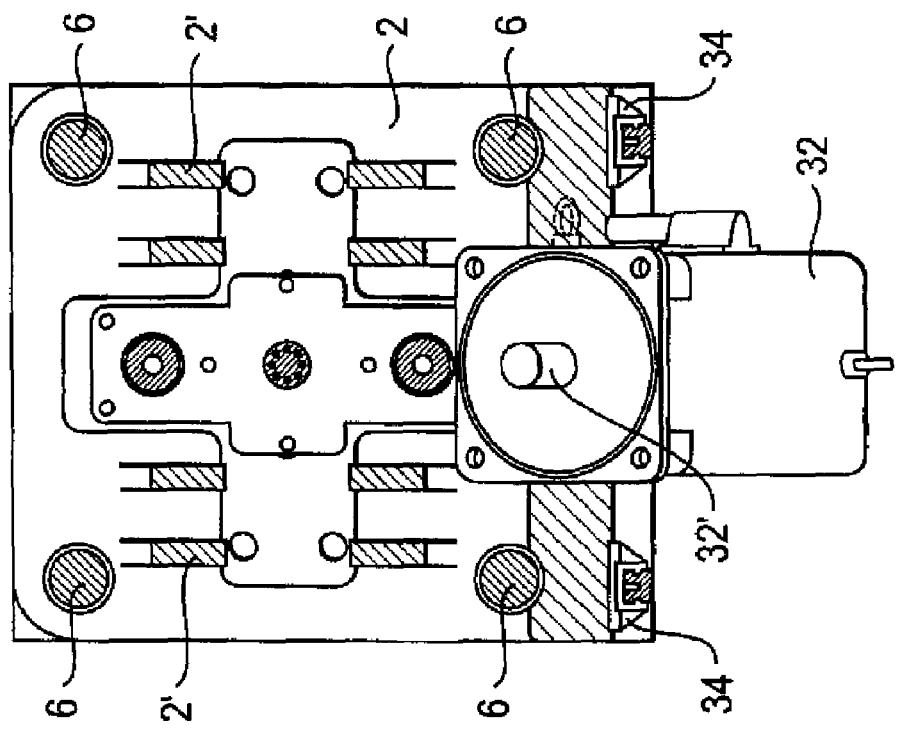
FIG. 6 is a schematic sectional view of the clamping unit, taken along the line VI-VI in FIG. 4.

Throughout all the Figures, same or corresponding elements are generally indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 3:
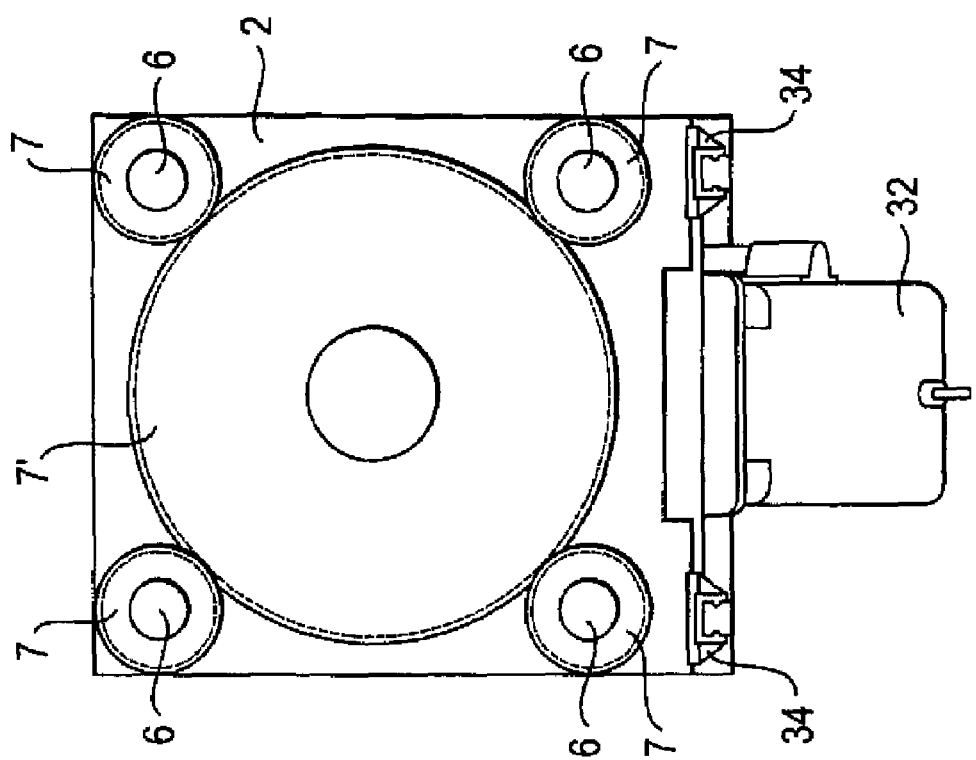
FIG. 3 is a schematic front view in a direction of the support platen of the clamping unit of FIG. 1.
Figure 7:
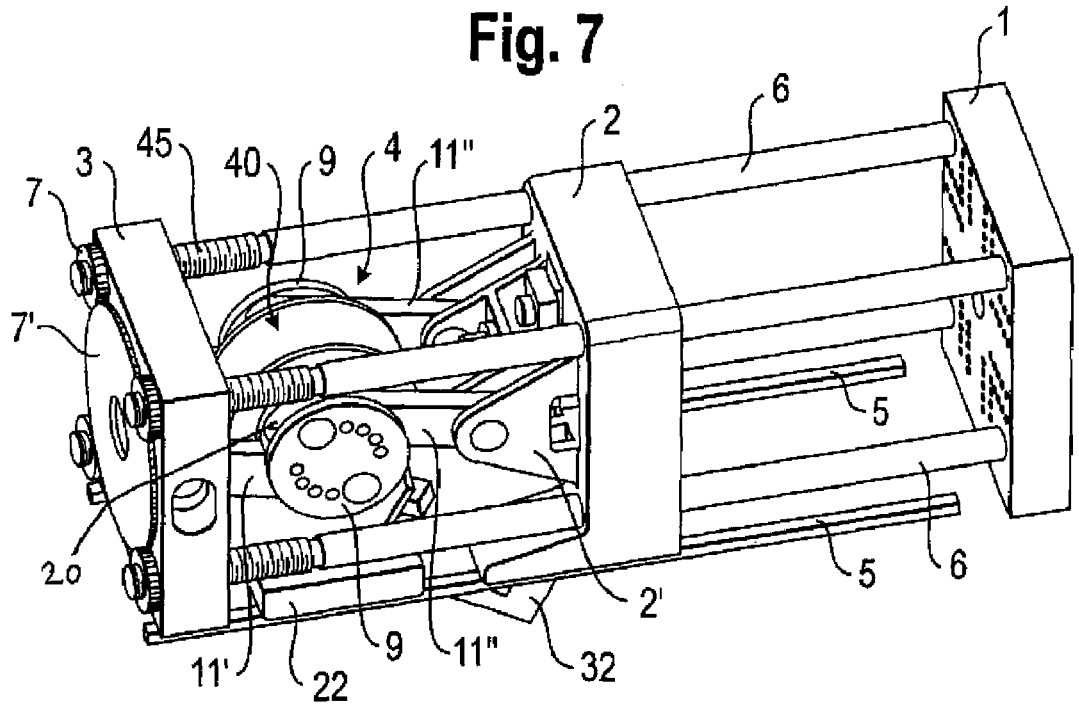
FIG. 7 is a schematic perspective view of the clamping unit of FIG. 1.

Turning now to the drawing, and in particular to FIGS. 1 and 7, there are shown a schematic side view and a perspective illustration of a clamping unit according to the invention, including a fixed platen 1 which is connected by a pulling means in the form of four ties 6 (cf. FIGS. 3, 6) with a support platen 3. It should however be noted that although the pulling means is illustrated in the drawing as including four ties, such illustration is for expediency only and should not be regarded as a limitation since the configuration of the pulling means is far from essential to this invention and any pulling means realizing a fixed linkage between the fixed platen 1 and the support platen 3 is conceivable without departing from the spirit of the present invention. The tie rods 6 are fixedly connected with the fixed platen 1 and each tie rod 6 is received in an associated spindle nut 7 (described in greater detail hereinafter) of the support platen 3. A moving platen 2 is disposed between the support platen 3 and the fixed platen 1 and formed with four bores for passage of the tie rods 6. Although not shown in detail, the fixed platen 1 can be supported upon a machine frame and suitably mounted thereto. Secured to the machine frame are also two guide rails 5 in parallel relationship for receiving the unit comprised of support platen 3, a moving platen 2, and a crank drive 4, whereby the support platen 3, the moving platen 2, and the crank drive 4 are arranged via carriages 34, 34' for linear movement along the guide rails 5.

Figure 5:
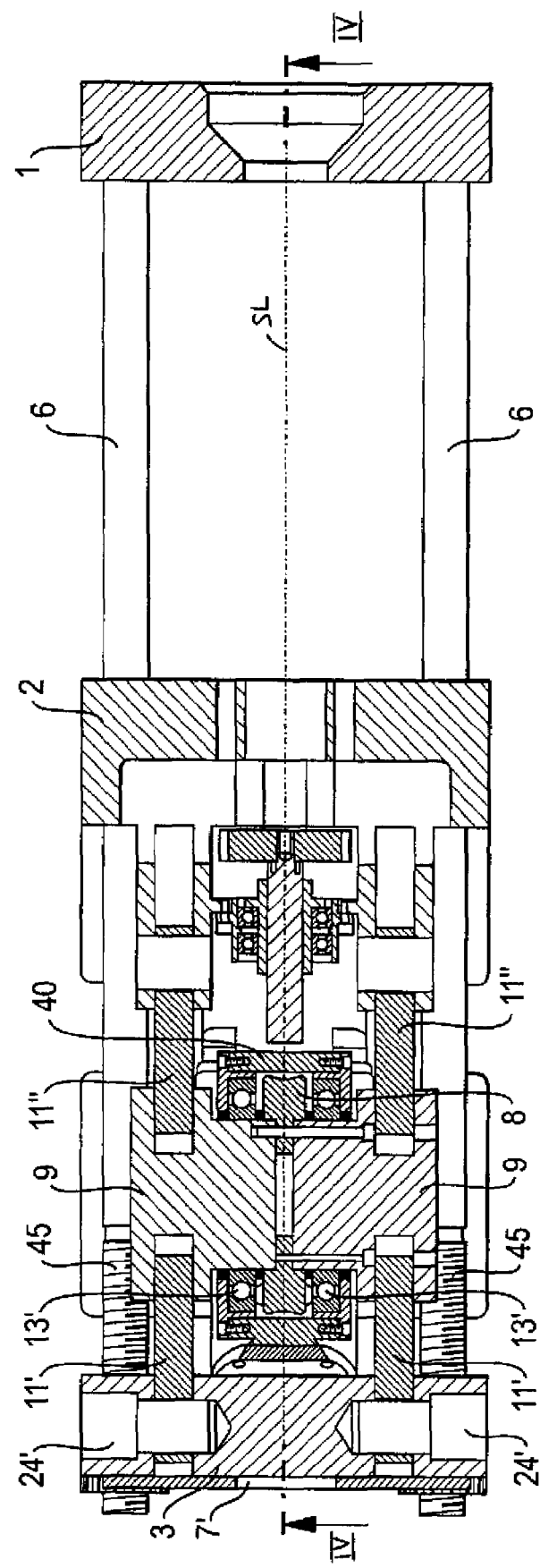
FIG. 5 is a schematic sectional view of the clamping unit, taken along the line V-V in FIG. 4.

The crank drive 4 represents the opening and closing mechanism for the clamping unit and includes two parallel crank disks 9 which are disposed symmetrically as mirror images of one another with respect to a symmetry line SL, as shown in FIG. 5, and rotatably supported in a housing 40. Each crank disk 9 has hereby an inner region with reduced diameter which is supported via a ball bearing 13' for rotation in the housing 40.

Arranged in coaxial relationship between the two crank disks 9 is a gear 8. Both crank disks 9 as well as the gear 8 are fixedly connected to one another by a number of screw fasteners to form a unitary structure. As also shown in FIG. 5, the housing 40 surrounds both ball bearings 13', the gear 8 as well as both inner regions of the crank disks 9.

As shown in particular in FIG. 7, the crank disks 9 include each in their axial outer regions two slot openings 20 in diametrically opposite and symmetrical relationship for receiving connecting rods 11', 11". Each crank disk 9 is connected via the connecting rod 11' with the support platen 3. Each connecting rod 11' has first and second bores respectively formed on both its axial ends. When assembled, bolts 24' (FIG. 1) are received in the first bore so that the connecting rods 11' are articulated and held on the support platen 3 for pivoting about the bolt 24'. Bolts 10 are inserted on the other side into the crank disks 9 and through the second bore of the connecting rods 11', such that the connecting rods 11' can pivot about these bolts 10 in the slot openings 20. By rotating the crank disks 9, the connecting rods 11' can be received, at least partly, in the slot openings 20.

Just like the connecting rods 11' connect the crank disks 9 with the support platen 3, the connecting rods 11' connect both crank disks 9 with the moving platen 2. The connecting rods 11" are held on bolts 10, which are provided in both crank disks 9, for pivoting in the slot openings 20. The respective other ends of the connecting rods 11" are swingably held in a bearing and mounting block 2' of the platen 2 by means of bolts 24". The number of components can be reduced when the connecting rods 11', 11" are designed identical. The same applies for the bolts 10, 24' and 24".

Figure 4:
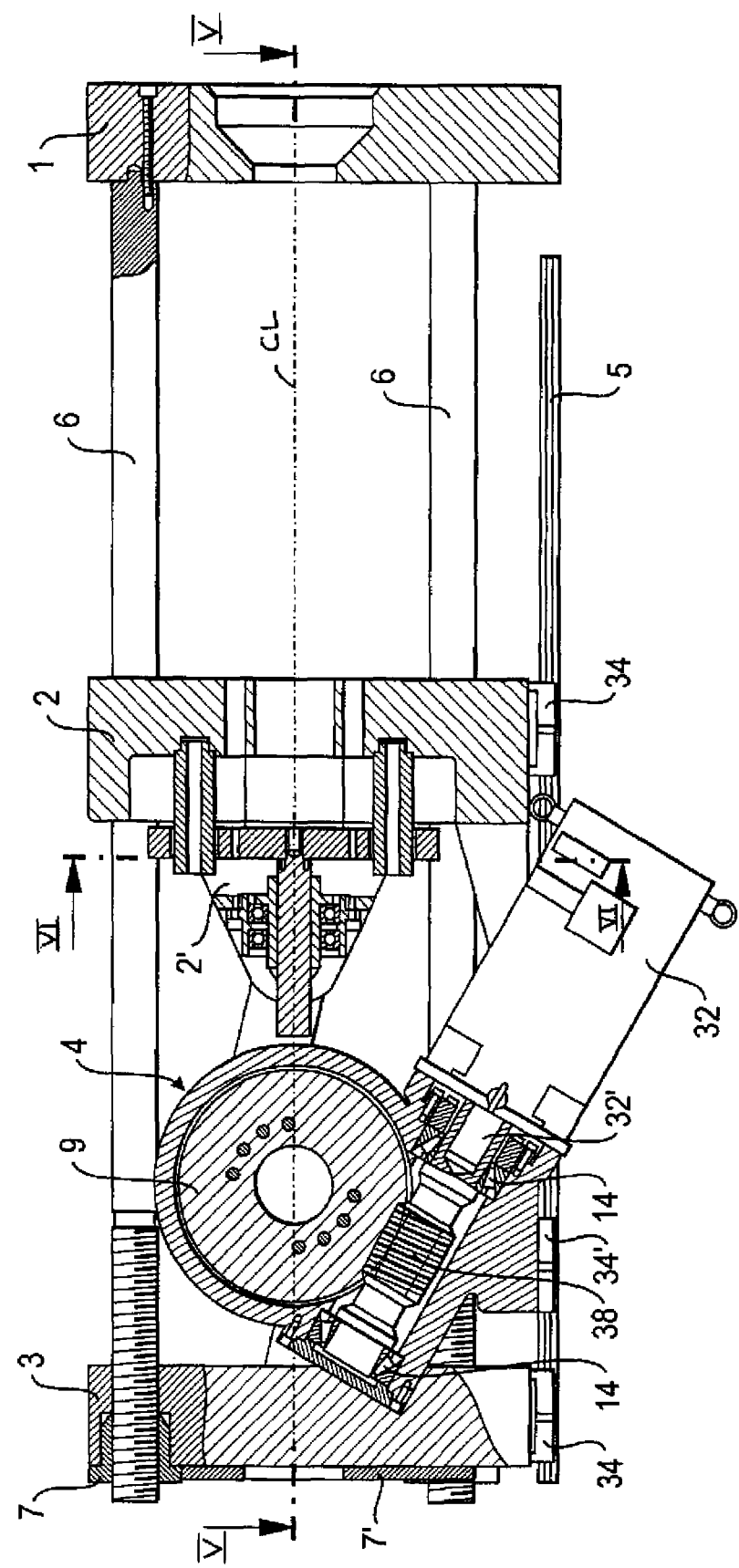
FIG. 4 is a schematic sectional side view of the clamping unit, taken along the line IV-IV in FIG. 5.

The Attachment points of the connecting rods 11' as well as of the connecting rods 11" on the support platen 3 and platen 2, respectively, are respectively selected in midsection in relation to the center line (line A-A in FIG. 4). As a consequence, the forces are applied substantially central upon the respective structural elements. The partial acceptance of the connecting rods 11' and 11" in the slot openings can be seen in FIG. 7 for example.

The crank drive 4 is driven in the present case by an electric motor 32 having a housing which is formed integral with the housing 40 of the crank drive 4. An output shaft 32' of the motor 32 is hereby connected to a driving screw 38 which is axially supported and held in the housing 40 by two bearings 12. When being caused to rotate, the screw 38 meshes with the gear 8 and causes both crank disks 9 to rotate, thereby forming a step-down gear mechanism.

As shown in particular in FIG. 1, the bolts 10 for swingably holding the connecting rods 11', 11" of a crank disk 9 are disposed in diametric relationship to a rotation axis RA of the crank disk 9. The closing position of the clamping unit is reached when the two bolts 10 occupy their lateral dead centers. The present construction permits a rotation in relation to this dead center position by about 120°, thereby enabling a maximal possible stroke of about 1.5 times the distance of both bolts 10 of a crank disk 9.

The common housing 40 of the crank drive 4 and the motor 32 has a bearing block 22 which is also movable on the rails 5, as shown in FIGS. 1 and 2.

As described above, the double crank drive allows a defined stroke. Should a mold of different thickness be installed in the clamping unit, it is necessary to modify the distance between the fixed platen 1 and the moving platen 2 in the closed position. For this purpose, the tie rods 6 are provided with threaded portions 45 at their ends proximal to the support platen 3 for respective interaction with a spindle (adjustment) nut 7 which is received in the support platen 3 axially fixed but rotatably movable. These spindle nuts 7, which have teeth on the outside, can be jointly rotated via a central gear 7'. Depending on the rotation, the entire unit of support platen 3, crank drive 4 as well as moving platen 2 can be moved in closing and opening directions as a result of the interaction with the threaded portions 45 of the tie rods 6.

The mode of operation of the clamping unit with the aforedescribed double crank drive is as follows:

None of the Figures show a mold on the fixed platen 1 as well as on the moving platen 2. Such a mold is mounted to the platens 1, 2 for operation. Depending on the mold, the distance for the closing position between the fixed platen 1 and the moving platen 2 is adjusted using the gear 7' and the spindle nuts 7. As a consequence, the support platen 3, the crank drive 4 as well as the moving platen 2 are correspondingly shifted. This shift may also be executed during service or maintenance.

During operation of the clamping unit, the support platen 3 remains stationary and the moving platen 2 moves back and forth in response to the alternating operation of the motor 32.

FIGS. 1, 2, 4, 5, 7 show the moving platen 2 in its open position. The crank disks 9 are hereby rotated by about 120° in relation to their dead center position. When the moving platen 2 should be closed, the motor 32 is operated accordingly so that the crank disks 9 rotate via the screw 38 and the gear 8. The rotation is about 120° in clockwise direction. As a result of this rotation, the unit of motor and gear mechanism as well as the moving platen 2 are shifted to the right in the direction of the fixed platen 1. The high gear reduction generates the high torque necessary for the clamping operation. The sinusoidal profile of the speed and force characteristic curves of the crank drive enables a rapid travel motion with subsequent buildup of the clamping force. Small crank deflections already result as a consequence of a use of the double crank drive in substantial travel paths so that a compact and simple construction can be realized.

Figure 8:
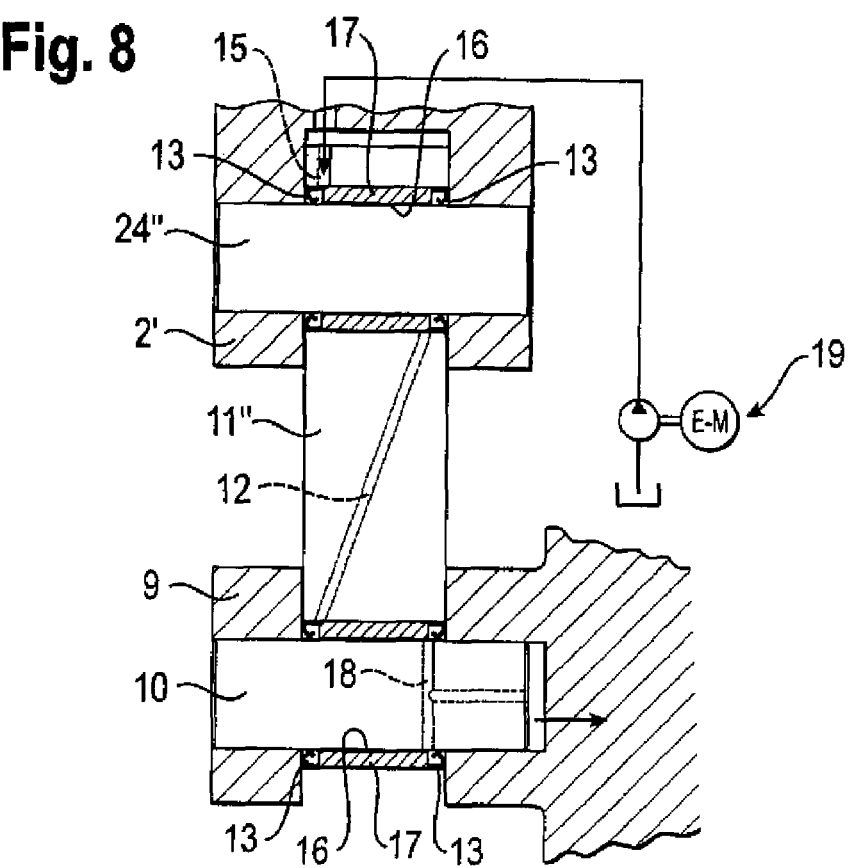
FIG. 8 is a schematic sectional illustration of a detail to depict lubrication for a connecting rod.

A good lubrication of the moving components is essential for a reliable, long-lasting operation of the clamping unit. The constructive implementation of such lubrication will now be described with reference to FIG. 8.

The connecting rods 11', 11" can be made of identical configuration in order to thereby reduce the number of different components. On both their ends, the connecting rods 11', 11" have each a bore. When installed, as shown by the partial sectional illustration in FIG. 8, bearing bushes 17 are placed into these connecting rod bores, suitably by interference fit. Provided on the side of the bearing bushes 17 are sealing rings 13, respectively, which define a small annular gap 16 for lubricant between the bolts 24', 24" and 10, respectively, and the bearing bushes 17. Lubricant is supplied by means of an electric motor and pump arrangement 19 via a feed bore 15 and a respectively connected line into the adjacent annular gap 16. Lubricant is evenly distributed in the entire space of the annular gap 16 by means of grooves or the like. The annular gaps 16 of each connecting rod 11', 11" are interconnected by a flow channel 12 so that lubricant can be routed from one annular gap 16 to the other annular gap 16 of the connecting rod. Moreover, a drain channel 18 is provided in the annular gap 16 adjacent to the bolt 10 for discharge of lubricant from this ring space. The drain channel 18 ports via a channel formed in the bolt 10 into the interior of the housing 40 of the crank drive to fill the housing 40 at least partly. Therefore, the gear 8 and the driving screw 38 are lubricated. Lubricant is drained from the housing 40 via an outlet and can be returned to the inlet 15 via the electric motor and pump arrangement 19.

As the connecting rods 11', 11" are of an identical construction, it will be understood by persons skilled in the art that the lubricant circulation is the same in each of the connecting rods 11', 11' during operation of the clamping unit: Lubricant is supplied via the inlet 15 by the electric motor and pump arrangement 19 to the adjacent annular gap 16, distributed there, and transferred to the other annular gap 16 via the flow channel 12. Lubricant flows from the other annular gap 16 via the drain channel 18 into the interior space of the housing 40 and is conducted back by the electric motor and pump arrangement 19 to the inlet 15. This lubrication requires merely an electric motor and pump arrangement with little output power in order to continuously supply lubricant to the pivot bearing at each connecting rod. Moreover, the gear set operates in the oil-filled gearbox. In addition, the drive set is encapsulated by the ring seals 13 and provided with leak-proof joints so that the clamping unit is fit for use in a clean room environment.

Of course, the present invention can be implemented in a way deviating from the present exemplified embodiment. For example, instead of two crank disks 9 also one or also more crank disks may be used. Likewise, one or more connecting rods of first and second types may be used. Also, many drive possibilities for the crank disks are available. In the present embodiment, it would be possible for example to provide two electric motors in order to better distribute the driving load upon the gear 8, on one hand. On the other hand, the motors may be constructed smaller. Of course, other alternative driving concepts for the crank disks are possible.

Figure 9:
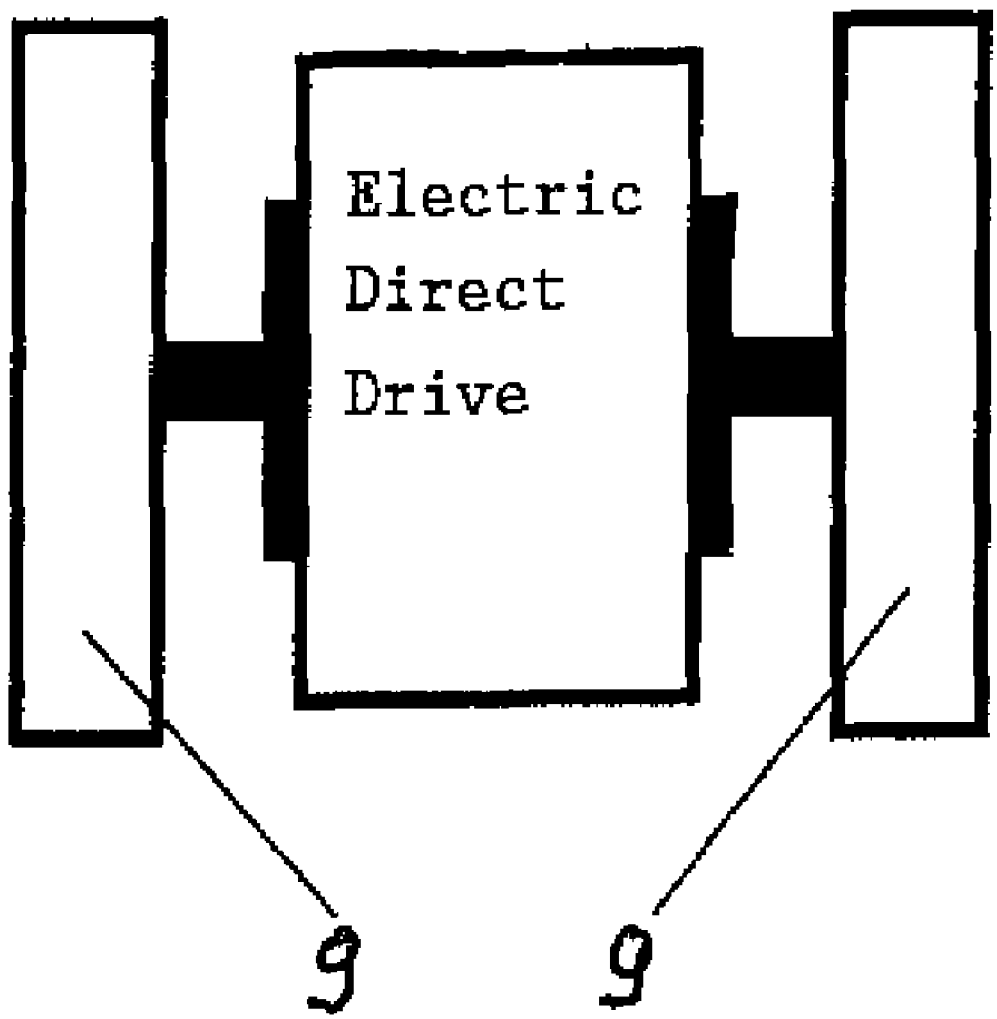
FIG. 9 is a schematic illustration of a variation of a drive mechanism for operating a clamping unit according to the invention.

FIG. 9 is a schematic illustration of a variation of a drive mechanism for operating a claping unit. The drive mechanism is here constructed in the form of an electric direct drive disposed between both crank disks 9 and having a stator and a rotor connected to the crank disks 9.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A clamping unit for an injection molding machine, comprising:
   a fixed platen;
   a support platen;

a moving platen arranged between the fixed platen and the support platen;

an opening and closing mechanism for back and forth movement of the moving platen in relation to the support platen, said opening and closing mechanism being constructed as crank drive having two crank disks which are arranged in parallel side-by-side disposition and connected in fixed rotative engagement, with each of the crank disks linked by first connecting rods to the support platen and by second connecting rods to the moving platen, a drive mechanism for rotating the crank disks wherein at least one of the first and second connecting rods is articulated in eccentric relationship to the crank disks; a gear arranged between and connected to the crank disks, said gear being in engagement with the drive mechanism; and a pulling means extending between the support platen and the fixed platen to allow a buildup of a clamping force between the fixed platen and the moving platen.

2. The clamping unit of claim 1, wherein the first and second connecting rods are articulated eccentrically to the crank disk.

3. The clamping unit of claim 2, wherein the first and second connecting rods are articulated at a same eccentricity to the crank disk and positioned in diametrically opposite relationship.

4. The clamping unit of claim 1, wherein the first and second connecting rods are articulated on the crank disk such that the crank disk is rotatable by about 120° to realize a closed position of the moving and fixed platens.

5. The clamping unit of claim 1, wherein the first and second connecting rods are disposed in alignment in a radial plane.

6. The clamping unit of claim 1, wherein the crank disks are placed in symmetry with respect to a center axis of the clamping unit.

7. The clamping unit of claim 1, wherein the drive mechanism is controllably constructed.

8. The clamping unit of claim 1, further comprising a housing for accommodating the crank disks.

9. The clamping unit of claim 1, wherein the drive mechanism includes an electric motor or a hydraulic motor in engagement with the gear via a pinion or a driving screw.

10. The clamping unit of claim 1, further comprising at least one guide rail for guiding the back and forth movement of the moving platen.

11. The clamping unit of claim 1, further comprising a bearing block for support of the crank drive and the drive mechanism, said bearing block being movable back and forth on at least one guide rail in opening and closing directions.

12. The clamping unit of claim 1, wherein the pulling means includes at least two tie rods.

13. The clamping unit of claim 1, wherein the pulling means includes four tie rods.

14. The clamping unit of claim 1, further comprising a drive unit for adjusting a position of the support platen in relation to the fixed platen.

15. The clamping unit of claim 14, wherein the pulling means includes at least two tie rods, each formed with a threaded portion, said drive unit including at least two rotatable adjustment nuts connected to the threaded portion of the tie rods in one-to-one correspondence.

16. The clamping unit of claim 1, further comprising a lubricant circulation for lubricating each of the first and second connecting rods.

17. The clamping unit of claim 16, wherein each of the first and second connecting rods has one axial end formed with a first bore for receiving a first bolt such that a first annular gap is defined between a wall of the first bore and the first bolt, and an opposite axial end formed with a second bore for receiving a second bolt such that a second annular gap is defined between a wall of the second bore and the second bolt, further comprising a first ring seal for laterally sealing the first annular gap, and a second ring seal for laterally sealing the second annular gap, wherein the lubricant circulation includes a flow channel fluidly interconnecting the first and second annular gaps, a lubricant inlet in one of the first and second annular gaps, and a lubricant drain in the other one of the first and second annular gaps.

18. The clamping unit of claim 17, further comprising a pump fluidly communicating, at least indirectly, with the lubricant inlet and fluidly communicating, at least indirectly with the lubricant drain.

19. The clamping unit of claim 17, further comprising bearing bushes placed in the first and second bores in one-to-one correspondence for acceptance of the first and second bolts, said first and second annular gaps being formed between the bearing bushes and the bolts.

20. The clamping unit of claim 18, wherein the crank drive has a housing having a drain connection fluidly communicating with the pump, said lubricant drain porting into the housing.

21. The clamping unit of claim 1, wherein the first and second connecting rods are of identical configuration.

22. The clamping unit of claim 1, wherein the opening and closing mechanism is configured to apply the clamping force in a dead center position of the crank drive.

23. A clamping unit for an injection molding machine, comprising:

a fixed platen;

a support platen;

a moving platen arranged between the fixed platen and the support platen;

an opening and closing mechanism for back and forth movement of the moving platen in relation to the support platen, said opening and closing mechanism being constructed as crank drive having two crank disks which are arranged in parallel side-by-side disposition and connected in fixed rotative engagement, with each of the crank disks linked by first connecting rods to the support platen and by second connecting rods to the moving platen, and an electric direct drive disposed between the crank disks for rotating the crank disks; and a pulling means extending between the support platen and the fixed platen to allow a buildup of a clamping force between the fixed platen and the moving platen.

* * * * *